US006978771B2

(12) United States Patent
Kuzuyama et al.

(10) Patent No.: US 6,978,771 B2
(45) Date of Patent: Dec. 27, 2005

(54) HOMOGENEOUS CHARGE COMPRESSION IGNITION ENGINE AND METHOD FOR OPERATING HOMOGENEOUS CHARGE COMPRESSION IGNITION ENGINE

(75) Inventors: Hiroshi Kuzuyama, Kariya (JP); Sigeru Aoki, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 11/113,409

(22) Filed: Apr. 22, 2005

(65) Prior Publication Data

US 2005/0235952 A1 Oct. 27, 2005

(30) Foreign Application Priority Data

Apr. 27, 2004 (JP) ............................. 2004-132059

(51) Int. Cl.[7] ............................................. F02B 47/08
(52) U.S. Cl. ......................... 123/568.11; 123/568.21; 123/294
(58) Field of Search ................. 123/294, 295, 123/299, 406.12, 406.37, 406.21, 344, 568.11, 123/568.14, 568.21

(56) References Cited

U.S. PATENT DOCUMENTS 6,142,117 A * 11/2000 Hori et al. ................. 123/295
6,234,139 B1 * 5/2001 Taga et al. ................. 123/295

FOREIGN PATENT DOCUMENTS

| JP | 2000-064863 | 2/2000 | .......... F02D 13/02 |
| JP | 2000-192846 | 7/2000 | .......... F02D 45/00 |
| JP | 2002-242710 | 8/2002 | .......... F02D 13/02 |

* cited by examiner

Primary Examiner—Bibhu Mohanty
(74) Attorney, Agent, or Firm—Morgan & Finnegan, LLP

(57) ABSTRACT

A homogeneous charge compression ignition engine for preventing knocking or misfires even if the air-fuel ratio deviates from a target value. The controller determines the possibility of misfires occurring due to changes in the air-fuel ratio based on a map showing the relationship of the air-fuel ratio and the timing at which the exhaust valve closes (EVC) when stable homogeneous charge compression ignition is enabled. When there is a possibility of misfires occurring, the controller retards the EVC. When there is a possibility of knocking occurring due to changes in the air-fuel ratio, the controller uses a map to advance the EVC.

13 Claims, 4 Drawing Sheets

HOMOGENEOUS CHARGE COMPRESSION IGNITION ENGINE AND METHOD FOR OPERATING HOMOGENEOUS CHARGE COMPRESSION IGNITION ENGINE

BACKGROUND OF THE INVENTION

The present invention relates to an internal combustion engine, and more particularly, to homogeneous charge compression ignition (HCCI) engine for use as a stationary engine for a private power generator and a method for operating such an engine.

Conventional engines may be categorized into two types, a spark ignition (SI) engine and a diesel engine. The thermal efficiency of the SI engine may be increased by causing the air-fuel mixture to be lean. However, there is a limit to the concentration ratio at which a spark may propagate. Thus, an SI engine requires adjustment of the amount of air with a throttle valve. As a result, the thermal efficiency of the SI engine is inferior to that of a diesel engine. Conversely, a diesel engine has satisfactory thermal efficiency. However, the diesel engine does not sufficiently mix fuel and air. As a result, NOx tends to be generated due to local combustion of fuel at high temperatures, and soot tends to be generated due to local enrichment.

In comparison with such engines, a homogeneous charge compression ignition (HCCI) engine premixes air and fuel. Thus, the possibility of local high temperature combustion or enrichment is small, and the generated amount of NOx and soot is subtle. Further, in a HCCI engine, chemical changes cause ignition. Thus, the dependency on the concentration ratio is lower than that of an SI engine. As a result, the HCCI engine is capable of causing air-fuel mixture to be significantly lean, while achieving thermal efficiency at the same level as a diesel engine. With such advantages, HCCI engines are receiving much attention. However, in a HCCI engine, excessive heat would result in sudden combustion, and insufficient heat would result in misfires. Thus, in comparison to other engines, misfires, knocking, and pre-ignition are apt to occurring more easily. This tends to narrow the operable range of the homogeneous charge compression ignition engine.

Japanese Laid-Open Patent Publication No. 2000-64863 describes a four-cycle engine that has low NOx emissions and reduces the amount of hydrocarbon (HC) emitted from the exhaust gas. The engine includes a variable valve actuation mechanism that selectively switches the valve timing of an intake valve and an exhaust valve in accordance with whether the load of the engine is low or high. When the engine load is low, as the load decreases the valve timing is set so that the exhaust valve closes at an advanced timing before the piston reaches top dead center during the exhaust stroke. When the engine load is high, the valve timing is set so that the exhaust valve closes when the piston is near the top dead center. Further, when the engine load is high, an igniter, which is arranged in the combustion chamber, ignites and burns fuel when the piston is near the compression top dead center. When the engine load is low, instead of igniting fuel with the igniter, the engine performs homogeneous charge compression ignition (HCCI). That is, during HCCI, the variable valve actuation mechanism adjusts the timing at which the exhaust valve closes to perform internal exhaust gas recirculation (EGR).

Japanese Laid-Open Patent Publication No. 2000-192846 describes a combustion controller for an engine that optimally controls the in-cylinder pressure and in-cylinder temperature, which are combustion control parameters, under conditions enabling HCCI. To stabilize HCCI, the combustion controller includes a means for calculating a target in-cylinder pressure and a target in-cylinder temperature that enables HCCI generating the required torque. The combustion controller also includes a means for controlling combustion parameters obtained from the calculated target in-cylinder pressure and target in-cylinder temperature. The combustion parameter control means includes a means for changing at least one of the in-cylinder pressure and the in-cylinder temperature to satisfy the target in-cylinder pressure and the target in-cylinder temperature. The combustion parameter control means also includes a means for calculating a target air-fuel ratio for the target in-cylinder pressure and the target in-cylinder temperature and controlling the air-fuel ratio to satisfy the target air-fuel ratio.

When performing HCCI operation in accordance with an intake air amount and fuel injection amount corresponding to the required engine load and speed, the air-fuel ratio may deviate from the target value due to a transitional state or due to deterioration of devices. When the air-fuel remains deviated, the air-fuel ratio may enter a range in which knocking or misfires occur. The deviation of the air-fuel ratio is corrected by adjusting the fuel injection amount and the open amount of the throttle valve. However, to prevent errors, such as normal overshooting from occurring, the fuel injection amount must be frequently changed in small amounts. This lengthens the time for converging the air-fuel ratio to the target value. Further, for example, with an engine of which fuel supply amount is difficult to control with high accuracy, such as a gas engine that supplies gas fuel to an intake passage with a mixer, more time is necessary for converging the air-fuel ratio to the target value. In an engine having a stable operation range that is narrow such as an HCCI engine, when much time is necessary for air-fuel ratio convergence as described above, the air-fuel ratio is apt to entering a range in which knocking or misfires occur.

The engine of Japanese Laid-Open Patent Publication No. 2000-64863 employs internal EGR to increase the temperature of the pre-mixture and facilitate ignition. More specifically, the engine of Japanese Laid-Open Patent Publication No. 2000-64863 increases the advanced amount of the closing timing of the exhaust valve to increase the internal EGR amount as the load decreases in a low load range, and decreases the advanced amount of the closing timing of the exhaust valve to decrease the internal EGR amount as the load increases in the low load range. However, the publication does not teach how to cope with deviations of the air-fuel ratio from the target value.

Japanese Laid-Open Patent Publication No. 2000-192846 explains that the air-fuel ratio has a strong influence on HCCI and that factors affecting the air-fuel ratio limit at which knocking occurs includes the in-cylinder temperature in addition to the in-cylinder pressure. The combustion controller of this publication calculates the target air-fuel ratio corresponding to the target in-cylinder pressure and the target in-cylinder temperature to control the air-fuel ratio so that it satisfies the target air-fuel ratio. However, the publication does not teach how to cope with deviations of the air-fuel ratio from the target value.

Normally, an air-fuel ratio sensor is arranged in an exhaust passage of an engine to monitor the combustion state and perform feedback control. When the air-fuel ratio deviates from the target value, an engine provided with such air-fuel ratio sensor is capable of having the deviated air-fuel ratio return to the target value. However, the employment of the air-fuel ratio sensor does not solve the problem of the long time required for the air-fuel ratio to converge with the target value.

A knocking sensor may be employed so that the air-fuel ratio is changed when knocking is detected in order to prevent continuation of knocking. However, in addition to being relatively expensive, the reliability of the knocking sensor for detecting knocking during HCCI is low.

SUMMARY OF THE INVENTION

The present invention provides a method for operating an HCCI engine that prevents the occurrence of knocking and misfires even when the air-fuel ratio deviates from a target value due to a transitional state or wear of devices.

The present invention further provides an HCCI engine that performs such operation method.

One aspect of the present invention is a method for operating a homogeneous charge compression ignition engine including a combustion chamber retaining a piston that compresses a mixture of fuel and oxygen-containing gas to ignite the compressed mixture, while internal exhaust gas recirculation is performed. The method includes determining the air-fuel ratio and the internal exhaust gas recirculation amount, determining whether there is a possibility of misfires or knocking occurring due to a change in the air-fuel ratio using a first map or first relationship formula showing the relationship of the air-fuel ratio and the internal exhaust gas recirculation amount in which stable homogeneous charge compression ignition operation is enabled, and adjusting the internal exhaust gas recirculation amount based on the first map or first relationship formula when there is a possibility of change in the air-fuel ratio causing misfires or knocking.

A further aspect of the present invention is a homogeneous charge compression ignition engine including a combustion chamber retaining a piston for compressing a mixture of fuel and oxygen-containing gas to ignite the compressed mixture. An intake valve draws the mixture or the oxygen-containing gas into the combustion chamber. An exhaust valve emits burned gas from the combustion chamber. A variable valve actuation mechanism opens and closes at least one of the intake valve and the exhaust valve to perform internal exhaust gas recirculation. An air-fuel ratio determination unit determines the air-fuel ratio. An internal exhaust gas recirculation amount determination unit determines the amount of exhaust gas recirculation. A storage device stores a first map or first relationship formula showing the relationship of the air-fuel ratio and the internal exhaust gas recirculation amount in which stable homogeneous charge compression ignition operation is enabled. The first map includes an upper limit and lower limit of the internal exhaust gas recirculation amount to define a range in which stable homogeneous charge compression ignition operation is enabled. A determination unit determines whether there is a possibility of misfires occurring by determining whether the air-fuel ratio corresponding to a target operation condition is changing so as to become greater than the upper limit of the internal exhaust gas recirculation amount. The determination unit further determines whether there is a possibility of knocking occurring by determining whether the air-fuel ratio corresponding to a target operation condition is changing so as to become less than the lower limit of the internal exhaust gas recirculation amount. A control unit controls the variable valve actuation mechanism to decrease the internal exhaust gas recirculation amount when there is a possibility of misfires occurring and increase the internal exhaust gas recirculation amount when there is a possibility of knocking occurring.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
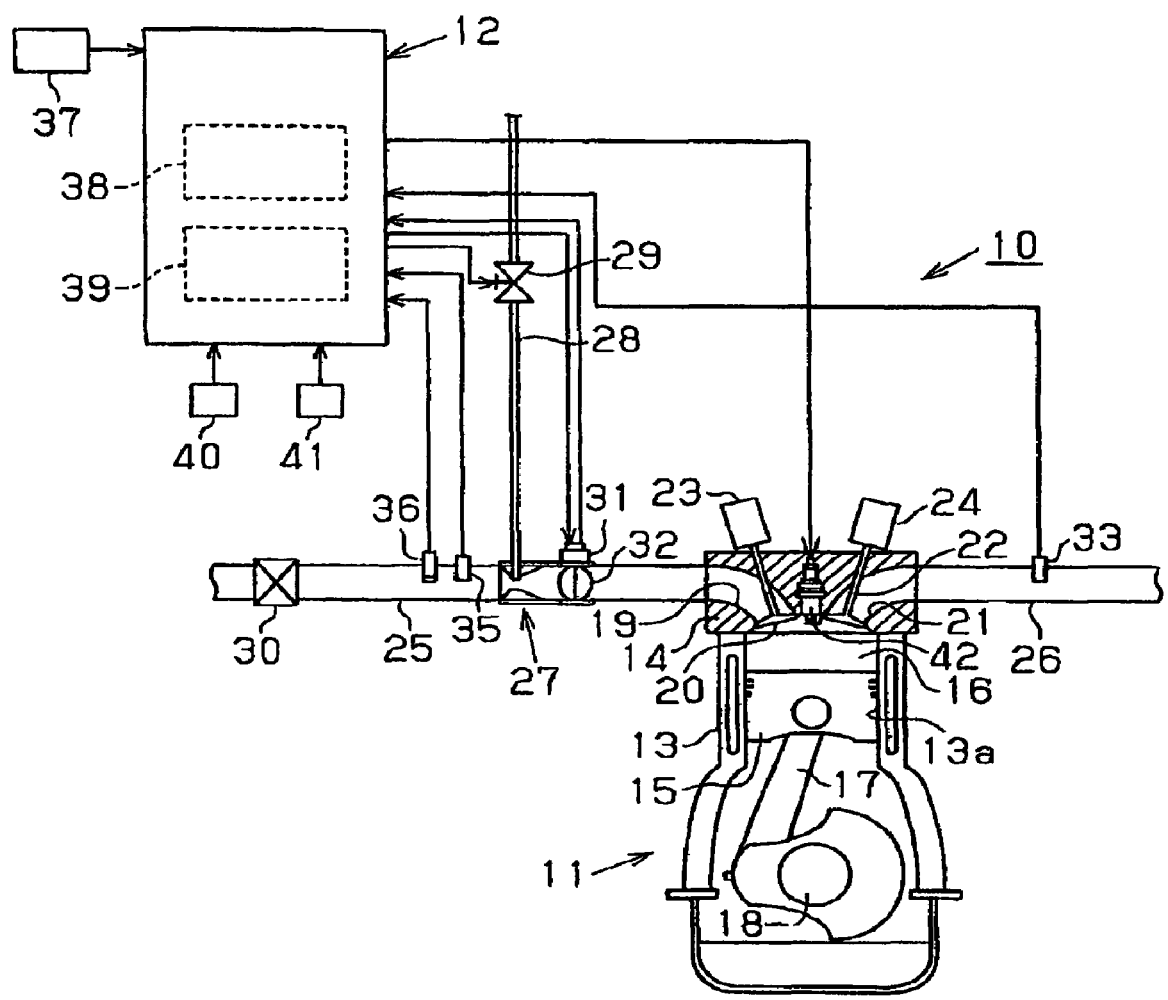
FIG. 1 is a schematic diagram of an HCCI engine according to a preferred embodiment of the present invention.

A stationary HCCI engine 10 according to a preferred embodiment of the present invention will now be described with reference to FIGS. 1 to 7. FIG. 1 is a schematic diagram of the HCCI engine 10.

The HCCI engine 10 includes an engine body 11 and a controller 12, which electronically controls the HCCI engine 10.

The engine body 11 includes a cylinder block 13, which houses a plurality of cylinders 13a (only one shown in FIG. 1), and a cylinder head 14. A piston 15 reciprocates in each cylinder 13a. A combustion chamber 16 is defined in each cylinder 13a between the piston 15 and the cylinder head 14. The piston 15 is propelled to reciprocate in the cylinder 13a by the force generated by the combustion of air-fuel mixture in the combustion chamber 16 after the intake and compression strokes. The reciprocation of the piston 15 is converted to rotation of a crankshaft 18, which functions as an output shaft, by a connection rod 17 to generate the output of the engine body 11. The engine body 11 is a four-cycle internal combustion engine.

An intake valve 20 for opening and closing an intake port 19 and an exhaust valve 22 for opening and closing an exhaust port 21 are provided for each cylinder 13a. Variable valve actuation mechanisms 23 and 24 vary the opening and closing timing of the intake and exhaust valves 20 and 22, respectively. The intake and exhaust valves 20 and 22 are independently opened and closed by the variable valve actuation mechanisms 23 and 24. The variable valve actuation mechanisms 23 and 24 are formed by, for example, an electromagnetic driver or a hydraulic actuator. A spark plug 42, which serves as an igniter, is installed in the cylinder head 14 for each combustion chamber 16. The spark plug 42 has an ignition portion that is exposed in the corresponding combustion chamber 16.

An intake passage 25, which extends to the intake ports 19, and an exhaust passage 26, which extends from the exhaust ports 21, are connected to the cylinder head 14. A mixer 27 is arranged in the intake passage 25. The mixer 27 is connected to a fuel tank (not shown) by a pipe 28. The mixer 27 includes a valve 32 operated by an electric motor 31. Adjustment of the open amount of the valve 32 adjusts the flow rate of intake air drawn into the combustion chambers 16. A regulator 29 for controlling the amount of fuel supply is arranged in the pipe 28. In this embodiment, natural gas is used as the fuel. Further, an air cleaner 30 is arranged in the intake passage 25 upstream from the mixer 27. A temperature sensor 35, which detects the temperature in the intake passage 25, and an airflow meter 36, which detects the flow rate of the intake air, are arranged in the intake passage 25 between the mixer 27 and the air cleaner 30.

An air-fuel ratio sensor (A/F sensor) 33 is arranged in the exhaust passage. The air-fuel ratio sensor 33 preferably detects the air-fuel ratio from the oxygen concentration and the non-burned gas concentration in the exhaust gas.

The controller 12, which controls the operation of the HCCI engine, controls the variable valve actuation mechanisms 23 and 24, the regulator 29, the electric motor 31, and the spark plugs 42 so that the engine 10 is operated in accordance with the required load and speed set by an output setting means.

The controller 12 incorporates a microcomputer 38. The microcomputer 38 includes a memory 39 (ROM and RAM), which functions as a storage device. The air-fuel ratio sensor 33, the temperature sensor 35, the airflow meter 36, a coolant temperature sensor 40 for detecting the coolant temperature in the engine body 11, and a speed sensor 41 for detecting the engine speed, or the rotation speed of the crankshaft 18, are each electrically connected to an input section (input interface) of the controller 12. The variable valve actuation mechanisms 23 and 24, the regulator 29, the electric motor 31, and the spark plugs 42 are each electrically connected to an output section (output interface) of the controller 12.

Based on detection signals output from the air-fuel ratio sensor 33, the temperature sensor 35, the airflow meter 36, the coolant temperature sensor 40, and the speed sensor 41, the controller 12 determines the operation state of the HCCI engine 10 and controls the variable valve actuation mechanisms 23 and 24, the regulator 29, the electric motor 31, and the spark plugs 42 to adjust the engine 10 to a predetermined operation state. The controller 12 calculates the air-fuel ratio based on the detection signals of the airflow meter 36 and the air-fuel ratio sensor 33. That is, the airflow meter 36, the air-fuel ratio sensor 33 and The controller 12 form a means for determining the air-fuel ratio.

The memory 39 stores maps, formulas, etc. used to determine command values (control values) for controlling the HCCI engine 10 based on the operation state of the engine 10 that is determined from the detection signals of the air-fuel ratio sensor 33, the temperature sensor 35, the airflow meter 36, the coolant temperature sensor 40, and the speed sensor 41. The maps and formulas include maps and formulas used to determine, for example, the amount of fuel supplied to the mixer 27, the open amount of the valve 32, and the ignition timing.

Figure 2:
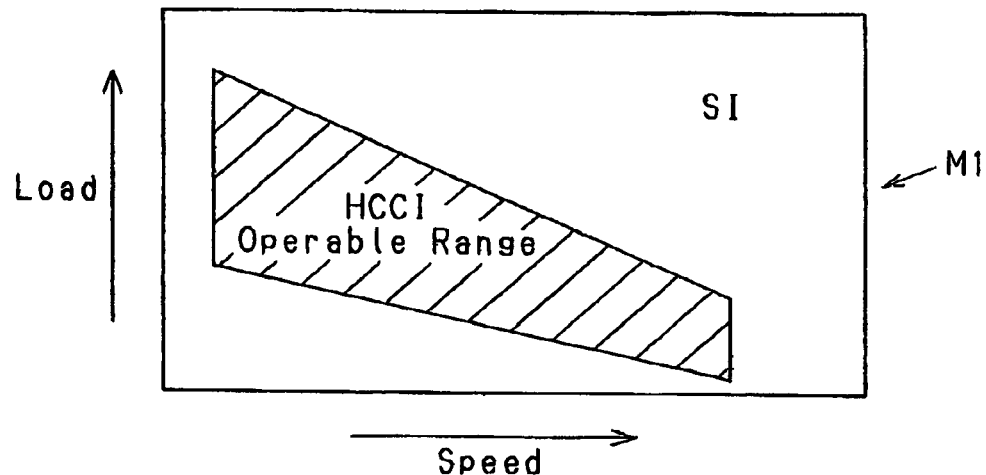
FIG. 2 is a diagram showing a map defining an HCCI operable range in relation with the engine speed and load.
Figure 3:
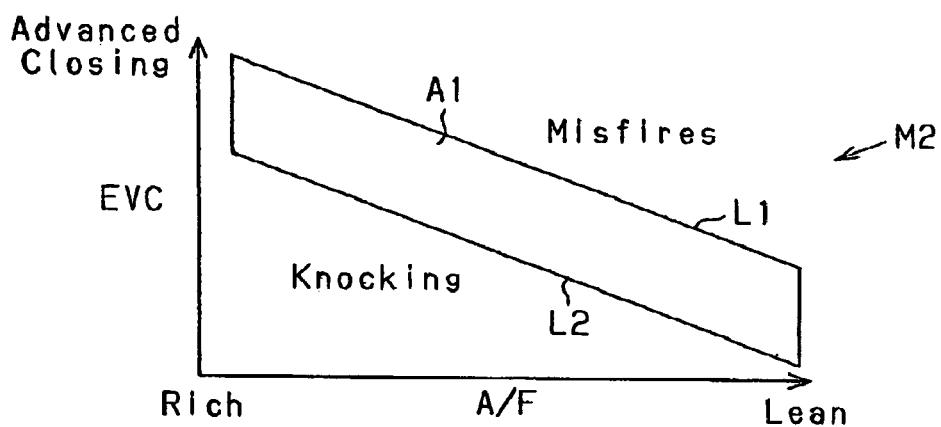
FIG. 3 is diagram showing a map defining the HCCI operable range in relation with EVC and the air-fuel ratio.
Figure 4:
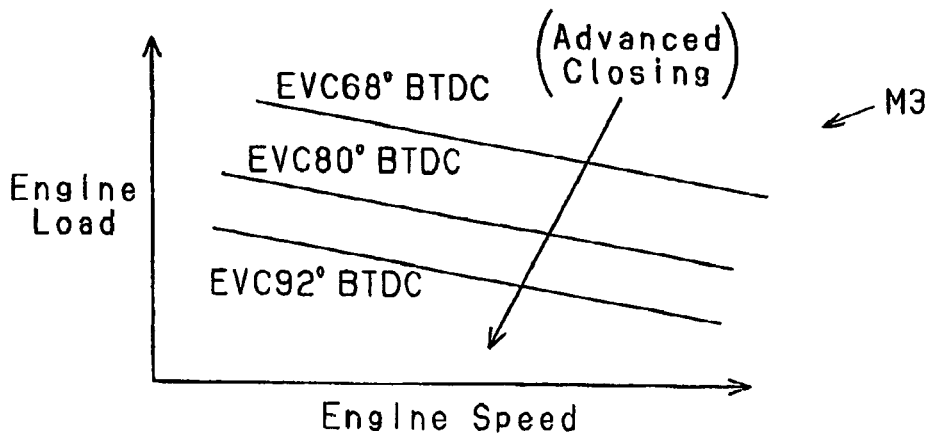
FIG. 4 is a diagram showing a map defining EVC that is determined in relation with the engine speed and load in the HCCI operable range.
Figure 5:
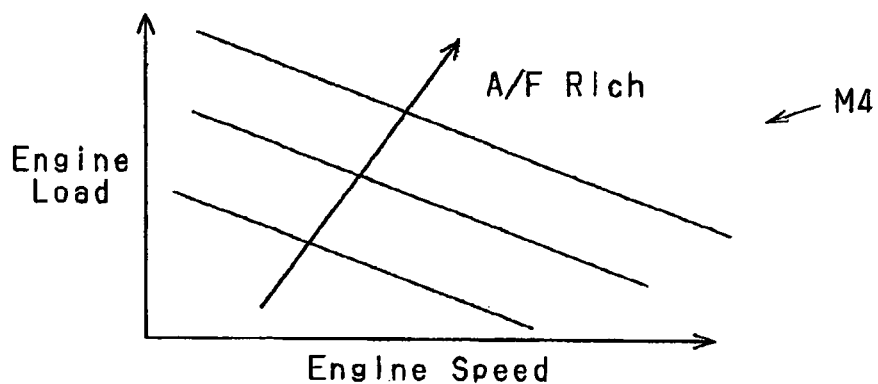
FIG. 5 is a diagram showing a map defining the air-fuel ratio that is determined in relation with the engine speed and load in the HCCI operable range.

The memory 39 stores HCCI operation maps M1, M2, M3, and M4 (refer to FIGS. 2 to 5). Referring to FIG. 2, the map M1 shows the HCCI operable range in relation with the load and rotation speed of the crankshaft 18 (i.e., engine speed). Referring to FIG. 3, the map M2 shows the HCCI operable range in relation with the exhaust valve closing (EVC) timing and the air-fuel ratio (A/F). In other words, the map M2 shows the range in which HCCI operation is enabled in relation with the air-fuel ratio and the amount of internal EGR. Referring to FIG. 4, the map M3 defines the EVC determined in relation with the engine speed and load in the HCCI operable range. Referring the FIG. 5, the map M4 defines the air-fuel ratio determined in relation with the engine speed and load in the HCCI operable range. In addition to the HCCI operation maps, the memory 39 stores maps for spark ignition operation (not shown). The maps are obtained beforehand through experiments.

The map M2 includes range A1, which is set in accordance with the target engine speed. The region A1 shows the relationship between the air-fuel ratio and the timing for closing the exhaust valve 22 (EVC) in a state in which HCCI is enabled. The boundary of range A1 is set taking into consideration a safety margin. In the map M2 of FIG. 3, the upper boundary line L1 of the range A1 is plotted in correspondence with the upper limit of the internal EGR amount enabling stable HCCI. The lower boundary line L2 of the range A1 is plotted in correspondence with the lower limit of the internal EGR amount enabling stable. HCCI.

Based on the map M1, the controller 12 determines whether HCCI operation is enabled in correspondence with the required load and speed. The controller 12 performs HCCI operation when HCCI operation is enabled and performs spark ignition operation when HCCI operation is disabled. Based on the map M2, the controller 12 determines whether the deviation amount of the present air-fuel ratio from the target air-fuel ratio corresponding to the target operation conditions is such that the internal. EGR amount must be adjusted to prevent the occurrence of knocking or misfires. In this embodiment, the controller 12 determines whether the air-fuel ratio is changing in a manner that may cause knocking and whether the air-fuel ratio is changing in a manner that may cause misfires. The phrase "changing in a manner that may cause knocking" refers to the air-fuel ratio changing such that it becomes greater than the upper boundary line L1 of range A1 in the map M2 of FIG. 3 when the present operation conditions are continued. The phrase "changing in a manner that may cause misfires" refers to the air-fuel ratio changing such that it becomes less than the lower boundary line L2 of range A1 in the map M2 of FIG. 3 when the present operation conditions are continued.

When the deviation of the air-fuel ratio is such that it changes and becomes greater than the upper limit of the internal EGR amount defining range A1 in which stable HCCI operation is enabled, the controller 12 controls the variable valve actuation mechanisms 23 and 24 to decrease the internal. EGR amount based on the map M2. Further, when the deviation of the air-fuel ratio is such that it changes and becomes less than the lower limit of the internal EGR amount defining range A1, the controller 12 controls the variable valve actuation mechanisms 23 and 24 to increase the internal EGR amount based on the map M2. The controller 12 functions as a means for controlling the variable valve actuation mechanisms 23 and 24 so that the internal EGR decreases when the deviation of the air-fuel ratio is such that it changes and becomes greater than the upper limit of the internal EGR amount defining range A1 and so that the internal EGR increases when the deviation of the air-fuel ratio is such that it changes and becomes less than the lower limit of the internal EGR amount.

Figure 6A:
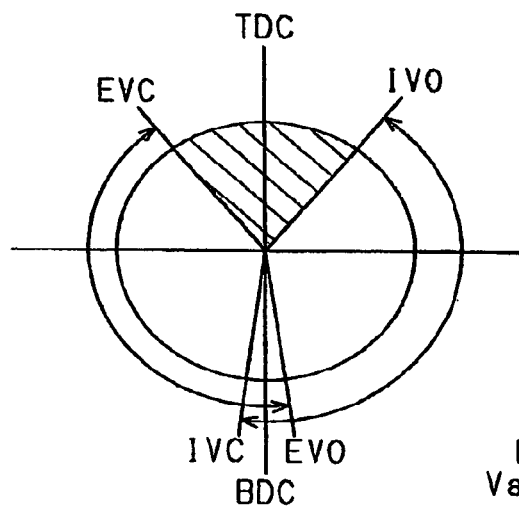
FIGS. 6(a) and 6(b) are diagrams showing the opening and closing timings of the intake valve and the exhaust valve.
Figure 6B:
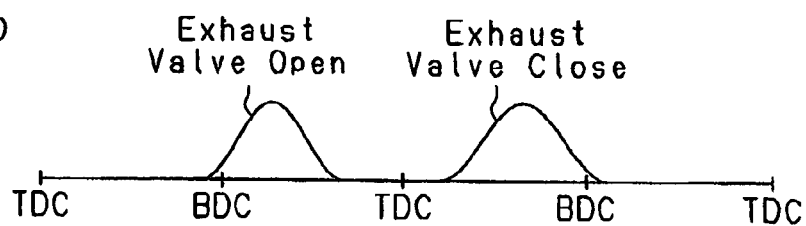

FIGS. 6(*a*) and 6(*b*) are diagrams showing an example of the valve timings of the variable valve actuation mechanisms 23 and 24. In this embodiment, internal EGR is performed by closing the exhaust valve 22 during the exhaust stroke so that some of the burned gas remains in the combustion chamber. As shown in FIGS. 6(*a*) and 6(*b*), the intake valve 20 opens when the piston 15 passes by the top dead center (TDC) and moves toward the bottom dead center (BDC). The intake valve 20 closes when the piston 15 passes by the bottom dead center (BDC) and moves toward the top dead center (TDC). Further, the exhaust valve 22 opens when the piston 15 approaches the bottom dead center (BDC) and closes when the piston 15 passes by the bottom dead center (BDC) and moves toward the top dead center (TDC). The controller 12 calculates the internal EGR amount based on the valve closing timing of the exhaust valve 22. The controller 12 functions as a means for determining the internal EGR amount.

The controller 12 controls the timing at which the exhaust valve 22 closes (EVC) based on the map M2 to prevent the air-fuel ratio from becoming a value at which knocking or misfires occur. When the air-fuel ratio is changing in a direction that would cause misfires, the controller 12 retards the EVC to decrease the internal EGR amount. When the air-fuel ratio is changing in a direction that would cause knocking, the controller 12 advances the EVC to decrease the internal EGR amount.

The operation of the HCCI engine 10 will now be described.

The controller 12 determines the operation state of the engine body 11 from detection signals of the coolant temperature sensor 40 and the speed sensor 41. Then, the controller 12 determines whether the required engine speed and load set by the output setting means 37 are satisfied. Based on the determination, the controller 12 performs HCCI operation or spark ignition operation. When HCCI operation is performed, the controller 12 controls the regulator 29, the electric motor 31, and the variable valve actuation mechanism 24 to obtain a suitable combustion state (i.e., suitable air-fuel ratio and internal EGR amount) in correspondence with the required engine speed and load. Further, when spark ignition operation is performed, the controller 12 controls the regulator 29, the electric motor 31, and the variable valve actuation mechanism 24 to obtain a combustion state (i.e., suitable air-fuel ratio and ignition timing) in correspondence with the required engine speed and load. When operating the HCCI engine 10, the controller 12 gives priority to HCCI operation. However, when the required engine speed and load are not in the HCCI operable range, the controller 12 performs spark ignition operation. Further, the controller 12 performs spark ignition operation until the HCCI engine 10 becomes warm.

Figure 7:
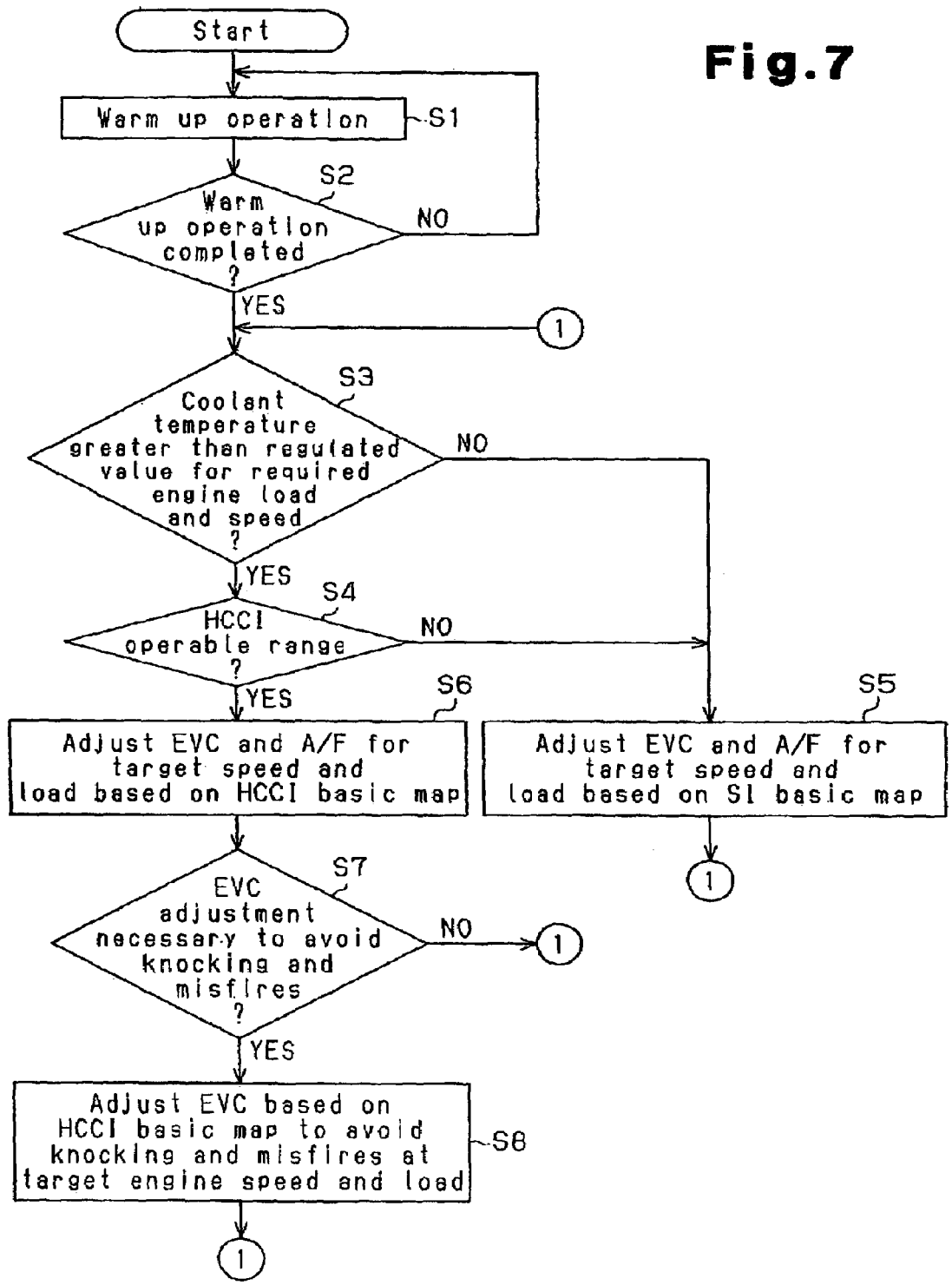
FIG. 7 is a flowchart showing the operation control of the HCCI engine of FIG. 1.

The operation of the HCCI engine 10 is performed in accordance with the flowchart of FIG. 7. First, in step S1, the engine 10 undergoes a warm up operation. The controller 12 provides command signals to the regulator 29 and the electric motor 31 so as to achieve the air-fuel ratio that satisfies warm up operation conditions based on a spark ignition operation map (SI basic map), which is stored in the memory 39. Further, the controller 12 provides command signals to the variable valve actuation mechanisms 23 and 24 and the spark plugs 42 so that internal EGR amount and ignition timing are suitably set for performing spark ignition to satisfy the warm up conditions.

Then, in step S2, the controller 12 determines whether or not the engine 10 has become warm based on the detection signal of the coolant temperature sensor 40. That is, the controller 12 determines whether the detection temperature of the coolant temperature sensor 40 is greater than or equal to a value indicating the engine 10 being warm. The controller 12 proceeds to step S3 if the warm up has been completed or returns to step S1 if the warm up has not been completed. The coolant temperature indicating that the HCCI engine 10 is warm is obtained beforehand through experiments.

In step S3, the controller 12 determines whether or not the present coolant temperature is greater than a regulated value corresponding to the required rotation speed and load. The controller 12 proceeds to step S4 if the coolant temperature is greater than the regulated value and proceeds to step S5 if the coolant temperature is less than or equal to the regulated value. The regulated value is stored in the memory 39 and is the temperature of the engine body 11 that enables stable HCCI operation in correspondence with the required engine speed and load when adjusting the air-fuel ratio and internal EGR amount. Further, the regulated value is obtained beforehand through experiments.

In step S4, the controller 12 determines from the map M1 of FIG. 2 whether the required engine speed and load are included in the HCCI operable range. The controller 12 proceeds to step S6 if the required engine speed and load are included in the HCCI operable range and proceeds to step S5 if the required engine speed and load are excluded from the HCCI operable range. In step S5, the controller 12 provides command signals to the regulator 29 and the electric motor 31 so that the air-fuel ratio is suitably set for spark ignition operation in correspondence with the required engine speed and load under the present coolant temperature. The controller 12 also provides a command signal to the variable valve actuation mechanisms 23 and 24 to obtain the suitable internal EGR amount. Then, the controller 12 proceeds to step S3. As a result, the HCCI engine 10 performs spark ignition operation to satisfy the required engine speed and load.

In step S6, the controller 12 determines the timing for closing the exhaust valve 22 (EVC) in correspondence with the required engine speed and load with the map M3, which serves as an HCCI basic map. Further, the controller 12 determines the air-fuel ratio corresponding to the required engine speed and load with the map M4, which also serves as an HCCI basic map. Then, the controller 12 provides the variable valve actuation mechanisms 23 and 24, the regulator 29, and the electric motor 31 with command signals to accordingly set the valve closing timing and the air-fuel ratio. As a result, the HCCI engine performs HCCI operation so as to satisfy the required rotation speed and load.

As shown in the map M3 of FIG. 4, the valve closing timing is more advanced for lower engine speeds and lower engine loads. As shown in the map M4 of FIG. 5, the air-fuel ratio is set to be richer for higher engine speeds and higher loads. This is because the period during which the exhaust valve 22 is open shortens at higher engine speeds. If the timing for closing the valve is the same as that for low speeds, the residual gas becomes excessive and causes the amount of air to be insufficient. Thus, the valve closing timing is delayed at high speeds to decrease the EGR amount. Further, to increase the internal EGR temperature and enable ignition at high speeds, the air-fuel ratio is adjusted to correspond to a richer state at higher speeds.

After executing step S6, the controller 12 proceeds to step S7. In step S7, the controller 12 recognizes the air-fuel ratio and the intake air temperature. Further, the controller 12 determines the air-fuel ratio and the internal EGR amount. Further, the controller 12 determines whether there is a need to adjust the closing timing of the exhaust valve 22 to prevent knocking or misfires based on the map M2 of the EVC and air-fuel ratio at the required engine speed. More specifically, the controller 12 checks where the determined air-fuel ratio and internal EGR amount are located in range A1, in which HCCI operation is stably performed. Further, the controller 12 determines whether or not the present location has changed from the location of the previous determination. The controller 12 also determines whether or not there is a possibility of knocking or misfires occurring due to such change. The controller 12 functions as a means for determining from the map M2 of the air-fuel ratio whether the deviation amount of the air-fuel ratio from the value corresponding to the target operation conditions is such that the internal EGR amount must be adjusted to prevent knocking or misfires. The controller 12 proceeds to step S3 when determining in step S7 that there is no need to adjust the closing timing of the exhaust valve 22 and proceeds to stop S8 when determining that there is a need for adjustment.

In step S8, the controller 12 adjusts the closing timing of the exhaust valve 22. More specifically, when the air-fuel ratio is changing in a manner that it may cause misfires, the controller 12 provides the variable valve actuation mechanism 24 with a command signal that retards the EVC based on the map M2 of the EVC and air-fuel ratio at the required engine speed. Further, when the air-fuel ratio is changing in a manner that it may cause knocking, the controller 12 provides the variable valve actuation mechanism 24 with a command signal that advances the EVC based on the map M2 of the EVC and air-fuel ratio at the required engine speed. When doing so, the controller 12 obtains the EVC suitable for the present air-fuel ratio based on the map M3 and M4 and provides the variable valve actuation mechanism 24 with a command signal to achieve that EVC. Consequently, when the air-fuel ratio is changing in a manner that it may cause misfires, the internal EGR amount is controlled so that it decreases. When the air-fuel ratio is changing in a manner that it may cause knocking, the internal EGR amount is controlled so that it increases. After executing step S8, the controller 12 proceeds to step S3. In step S8, the controller 12 functions as a means for controlling the variable valve actuation mechanism so that the internal EGR amount decreases when the air-fuel ratio deviation is changing in a manner that the air-fuel ratio will become greater than the upper limit of the internal. EGR amount defining the range in which stable HCCI operation is enabled. The controller 12 also functions as a means for controlling the variable valve actuation mechanism so that the internal EGR amount increases when the air-fuel ratio deviation is changing in a manner that the air-fuel ratio will become less than the lower limit of the internal EGR amount.

Accordingly, when the required engine speed and load do not change and thus stabilize the HCCI operation, the controller 12 repeats steps S3, S4, S6, and S7. This continues HCCI operation under the predetermined EVC and air-fuel ratio that correspond to the required engine speed and load. When there is a possibility of the air-fuel ratio deviating from the target value and causing knocking or misfires, steps S3, S4, S6, S7, and S8 are repeated.

Unlike an automobile engine, the required engine speed and load do not change frequently in the HCCI engine 10. However, there are cases in which the required engine speed and load may be significantly changed. In such a case, the target air-fuel ratio of the present operation state is changed in correspondence with the changed operation conditions to a new target air-fuel ratio. In this state, when the air-fuel ratio becomes deviated from the target value and there is a possibility of knocking or misfires occurring, adjustment of the open amount of the regulator 29 or the valve 32 may not readily converge the air-fuel ratio with the target value. This may result in knocking or misfires.

This is because fuel (natural gas) and air are supplied to the combustion chamber 16 using negative pressure. Thus, changes in the negative pressure changes the supplied amount of fuel and air. Further, the fuel supply system includes the mixer 27 and the regulator 29. However, it is difficult to control the supplied amount of the gas fuel with the mixer 27. Further, when the regulator 29 has poor sensitivity or when wear occurs, it is difficult for the air-fuel ratio to readily converge with the target value. This tendency is especially strong in a transitional state such as when the target air-fuel ratio is drastically changed. However, when the EVC is varied to adjust the EGR amount in order to change the air-fuel ratio, such delay in air-fuel ratio convergence does not occur. Thus, knocking or misfires caused by deviation of the air-fuel ratio are suppressed.

In addition to the temperature of the compressed air-fuel mixture, the air-fuel ratio affects knocking and misfires. If the air-fuel ratio of the mixture at a high temperature is the same as the air-fuel ratio of the mixture at a low temperature, knocking tends to occur more easily with the mixture compressed at a high temperature. In this state, misfires do not occur. Accordingly, a lower temperature of the compressed mixture is effective for preventing knocking, and a higher temperature of the compressed mixture is effective for preventing misfires. However, since internal EGR gas cannot be burned, an excessive amount of EGR would result in lack of oxygen and cause misfires. Further, the specific heat of the internal EGR gas is greater than that of air and fuel. Thus, it may become difficult to raise the temperature of the compressed mixture when the internal EGR amount increases depending on the circumstances.

When the air-fuel ratio is deviated from the target value, a process for correcting the air-fuel ratio is additionally performed. To correct the air-fuel ratio, for example, when the deviation is due to wear of devices related to air-fuel ratio adjustment, such as the regulator 29, taking the wear into consideration, a map for controlling the fuel supply means (regulator 29) is corrected or a correction term is added.

The HCCI engine 10 of this embodiment has the advantages described below.

(1) The HCCI engine 10 includes the means for determining the air-fuel ratio, the variable valve actuation mechanisms 23 and 24, and the memory 39 storing the map M2, which shows the relationship of the air-fuel ratio and EVC in which stable HCCI operation is enabled. The controller 12 determines the air-fuel ratio and the internal EGR amount and controls the variable valve actuation mechanisms 23 and 24 to adjust the internal EGR amount based on the map M2. Accordingly, when performing HCCI operation at the target air-fuel ratio corresponding to the required engine speed and load, knocking and misfires are prevented even if the air-fuel ratio deviates from the target value due to a transitional state or device wear. That is, stable HCCI operation is performed without using a knocking sensor having low reliability.

(2) Each combustion chamber 16 of the HCCI engine 10 includes the spark plug 42 to perform spark ignition operation until the engine 10 becomes warm. Then, HCCI operation is performed when the required engine speed and load are in an HCCI operable range. Accordingly, the HCCI engine 10 is operated in a stable state from when it is started even in a relatively cold environment. Further, in comparison to an HCCI engine that cannot perform spark ignition, the HCCI engine 10 is applicable to requirements for higher engine speeds and higher loads.

(3) In addition to the HCCI operation map, the memory 39 includes a spark ignition map. Accordingly, when the required engine speed and load cannot be satisfied through HCCI operation, the HCCI engine 10 is easily switched to spark ignition operation that satisfies the required engine speed and load.

(4) The map M2 is set with a safety margin taken into consideration for the boundary of range A1, which shows the relationship between the EVC and air fuel ratio enabling HCCI operation. Accordingly, when the air-fuel ratio deviates from the target value, the operation conditions remain in the HCCI operable range.

(5) Internal EGR is performed by closing the exhaust valve 22 during the exhaust stroke and so that some of the burned gas remains in the combustion chamber 16. This facilitates the control of the opening and closing timings of the exhaust valve 22 in comparison to when temporarily opening and closing the exhaust valve 22 during the intake stroke to draw back the exhaust gas in the exhaust port 21 through the exhaust valve 22 and into the combustion chamber 16 in order to mix the exhaust gas with fresh air-fuel mixture.

(6) The variable valve actuation mechanisms 23 and 24 are formed by electromagnetic drivers or hydraulic actuators. Accordingly, the closing timing of the exhaust valve 22 may be freely changed. This facilitates the control of HCCI and spark ignition.

(7) The controller 12 calculates and determines the air-fuel ratio based on the detection signals of the airflow meter 36 and the air-fuel ratio sensor 33. Accordingly, the air-fuel ratio is correctly determined even when using the mixer 27 of which gas fuel supply control is difficult to perform with high accuracy.

It should be apparent to those skilled in the art that the present invention may be embodied in many other specific forms without departing from the spirit or scope of the invention. Particularly, it should be understood that the present invention may be embodied in the following forms.

Internal EGR may be performed by employing a first technique that opens the exhaust valve during the intake stroke to draw back some of the exhaust gas from the exhaust port 21 to the combustion chamber 16 to mix the exhaust gas with fresh air-fuel mixture. Further, in the first technique, an exhaust gas guide passage, which is connected to the combustion chamber 16 and the exhaust port 21, and a valve, which closes and opens the exhaust gas guide passage, are employed to draw back some of the exhaust gas in the exhaust port 21 to the combustion chamber to mix the drawn back exhaust gas with fresh air-fuel mixture. Further, a second technique for internal EGR may be employed. In the second technique, when shifting from the exhaust stroke to the intake stroke, the intake valve 20 is opened when the exhaust valve 22 is still open before the piston 15 reaches the top dead center. This returns some of the burned gas into the intake port 19. The burned gas that is returned is drawn into the combustion chamber 16 during the intake stroke together with fresh air-fuel mixture. The maps that are used are slightly altered depending on the internal EGR technique. For example, with the first technique, the internal EGR amount is determined by the period during which the valve in the exhaust gas guide passage is open in the intake stroke. With the second technique, the EGR amount is determined by the period during which the intake valve 20 is open during the exhaust stoke. Accordingly, the vertical axis of the map M2 represents the EGR amount instead of EVC, and the controller 12 calculates the opening and closing timings of the exhaust valve 22 or the intake valve 20 to obtain the corresponding EGR amount.

It may be determined whether the air-fuel ratio is changing from a value corresponding to a target operation condition towards a value that causes knocking or misfires based on a relationship formula, which shows the relationship between the air-fuel ratio and internal EGR amount in which stable HCCI operation is enabled, and the air-fuel ratio determined by an air-fuel ratio determination means.

When adjusting the internal EGR amount to prevent knocking or misfires caused by changes in the air-fuel ratio, the internal EGR amount may frequently be adjusted in small amounts.

The HCCI engine 10 does not necessarily have to be provided with an igniter and may perform only HCCI.

In an HCCI engine 10 that is not provided with an igniter, fuel that ignites easily when compressed may be used during warm up operations. In such case, subsequent to the warm up operation, the fuel is switched to one used for normal operations.

The HCCI engine 10 may be provided with an electric heater that heats oxygen-containing gas or air-fuel mixture. In this case, the electric heater heats the oxygen-containing gas or air-fuel mixture during warm-up operations in which the temperature of the exhaust gas or coolant is low. This heats the oxygen-containing gas or air-fuel mixture with the electric heater to the necessary temperature within a short period and stabilizes warm-up operation. Further, when performing HCCI operation subsequent to the warm-up operation, the electric heater may effectively be used when there is a need to heat the oxygen-containing gas or air-fuel mixture within a short period.

When the HCCI engine 10 is provided with the igniters (spark plugs 42), only spark ignition may be performed during warm-up operations and only HCCI operation may be performed after completion of a warm-up operation. In this case, it is preferred that the HCCI engine 10 be operated to obtain the air-fuel ratio and internal EGR amount that are close to the corresponding engine speed and load.

Instead of performing step S3 of the flowchart shown in FIG. 7 when determining the operation state of the HCCI engine 10, the controller 12 may determine whether the temperature of the engine oil is greater than a regulated value corresponding to the require engine speed and load. Alternatively, the controller 12 may determine whether the coolant temperature and the engine oil temperature are both greater than regulated values corresponding to the required engine speed and load.

In the map M1, instead of directly showing the load, other values corresponding to load, such as indicated mean effective pressure (IMEP), or an operation amount of a setting means for setting the required load may be employed.

In the map M2, instead of showing the relationship between EVC and the air-fuel ratio (A/F), the map M2 may show the relation between the internal EGR amount and the air-fuel ratio in which stable HCCI operation is enabled (range A1).

The fuel of the HCCI engine 10 is not limited to natural gas and may be any type of fuel, such as gasoline, propane gas, methanol, dimethylether, hydrogen, and diesel fuel.

When vaporizing liquid fuel (e.g., liquefied gas) or increasing the pressure of a gas fuel, a fuel injection nozzle may be used in lieu of the mixer 27 to supply the intake passage 25 with fuel from the fuel injection nozzle. In this case, a flow rate control means (e.g., throttle valve) for controlling the flow rate of the oxygen-containing gas is arranged upstream from the fuel injection nozzle in the intake passage 25.

When using the fuel injection nozzle, the controller 12 does not have to calculate the air-fuel ratio with the air-fuel ratio sensor 33. The controller 12 may calculate the air fuel ratio based on the open amount of an electromagnetic control valve, which controls the amount of fuel supplied to the fuel injection valve, and the detection signal of the air-flow meter.

The HCCI engine 10 is not limited to a four-cycle engine and may be a two-cycle engine.

The fuel of the air-fuel mixture does not have to be a gas and may be atomized fuel.

The oxygen-containing gas mixed with fuel is not limited to air and may be any oxygen-containing gas that contains oxygen required for burning fuel. For example, a gas produced by mixing oxygen with air to increase the oxygen concentration may be used.

Fuel does not have to be injected into the intake passage 25 and mixed with oxygen-containing gas to produce an air-fuel mixture drawn into the combustion chamber 16. For example, fuel may be injected into the combustion chamber 16 during the intake stroke. Further, the fuel may be mixed with intake air in a carburetor.

The HCCI engine 10 does not have to have a plurality of cylinders and may have only one cylinder.

The variable valve actuation mechanism 23 and 24 may each be a known variable valve timing mechanism that uses a camshaft to open and close an intake valve or exhaust valve by means of a cam or rocker arm.

The HCCI engine 10 does not have to be stationary and may be used as an automobile engine. In such a case, the engine 10 must be switchable between HCCI operation and spark ignition operation.

Instead of the map M1, a relationship formula indicating the relationship between the engine speed and load in the HCCI operable range may be used. Instead of the map M2, a relationship formula indicating the relationship between the internal EGR amount and the air-fuel ratio in the HCCI operable range may be used. Instead of the map M3, a relationship formula indicating the EVC with relation to the engine speed and load during HCCI may be used. Instead of the map M4, a relationship formula indicating the air-fuel ratio with relation to the engine speed and the EVC may be used. Each relationship formula is stored in the memory 39.

The present examples and embodiments are to be considered as illustrative and not restrictive, and the invention is not to be limited to the details given herein, but may be modified within the scope and equivalence of the appended claims.

What is claimed is:

1. A method for operating a homogeneous charge compression ignition engine including a combustion chamber retaining a piston that compresses a mixture of fuel and oxygen-containing gas to ignite the compressed mixture, while internal exhaust gas recirculation is performed, the method comprising:

determining the air-fuel ratio and the internal exhaust gas recirculation amount;

determining whether there is a possibility of misfires or knocking occurring due to a change in the air-fuel ratio using a first map or first relationship formula showing the relationship of the air-fuel ratio and the internal exhaust gas recirculation amount in which stable homogeneous charge compression ignition operation is enabled; and adjusting the internal exhaust gas recirculation amount based on the first map or first relationship formula when there is a possibility of change in the air-fuel ratio causing misfires or knocking.

2. The method according to claim 1, wherein the first map includes an upper limit and lower limit of the internal exhaust gas recirculation amount to define a range in which stable homogeneous charge compression ignition operation is enabled, said determining whether there is a possibility of misfires or knocking occurring includes:

determining whether there is a possibility of misfires occurring by determining whether the air-fuel ratio corresponding to a target operation condition is changing so as to become greater than the upper limit of the internal exhaust gas recirculation amount; and determining whether there is a possibility of knocking occurring by determining whether the air-fuel ratio corresponding to a target operation condition is changing so as to become less than the lower limit of the internal exhaust gas recirculation amount.

3. The method according to claim 2, wherein said adjusting the internal exhaust gas recirculation amount includes:

decreasing the internal exhaust gas recirculation amount when there is a possibility of misfires occurring due to a change in the air-fuel ratio; and increasing the internal exhaust gas recirculation amount when there is a possibility of knocking occurring due to a change in the air-fuel ratio.

4. The method according to claim 1, further comprising:

determining whether homogeneous charge compression ignition operation is enabled using a second map or second relationship formula showing the relationship of the engine speed and engine load at which stable homogeneous charge compression ignition operation is enabled.

5. The method according to claim 1, wherein the homogeneous charge compression ignition engine includes an igniter arranged in the combustion chamber, the method further comprising:

comparing coolant temperature of the homogeneous charge compression ignition engine with a regulated value to determine whether homogeneous charge compression ignition is enabled; and performing spark ignition operation with the igniter when homogeneous charge compression ignition operation is disabled.

6. The method according to claim 1, wherein the homogeneous charge compression ignition engine includes an igniter arranged in the combustion chamber, the method further comprising:

performing spark ignition operation with the igniter until the engine becomes warm; and determining whether homogeneous charge compression ignition operation is enabled after the engine becomes warm using a second map or second relationship formula showing the relationship of the engine speed and load in which stable homogeneous charge compression ignition operation is enabled.

7. A homogeneous charge compression ignition engine comprising:

a combustion chamber retaining a piston for compressing a mixture of fuel and oxygen-containing gas to ignite the compressed mixture;

an intake valve for drawing the mixture or the oxygen-containing gas into the combustion chamber;

an exhaust valve for emitting burned gas from the combustion chamber;

a variable valve actuation mechanism for opening and closing at least one of the intake valve and the exhaust valve to perform internal exhaust gas recirculation;

an air-fuel ratio determination unit for determining the air-fuel ratio;

an internal exhaust gas recirculation amount determination unit for determining the amount of exhaust gas recirculation;

a storage device for storing a first map or first relationship formula showing the relationship of the air-fuel ratio and the internal exhaust gas recirculation amount in which stable homogeneous charge compression ignition operation is enabled, the first map including an upper limit and lower limit of the internal exhaust gas recirculation amount to define a range in which stable homogeneous charge compression ignition operation is enabled;

a determination unit for determining whether there is a possibility of misfires occurring by determining whether the air-fuel ratio corresponding to a target operation condition is changing so as to become greater than the upper limit of the internal exhaust gas recirculation amount, the determination unit further determining whether there is a possibility of knocking occurring by determining whether the air-fuel ratio corresponding to a target operation condition is changing so as to become less than the lower limit of the internal exhaust gas recirculation amount; and a control unit for controlling the variable valve actuation mechanism to decrease the internal exhaust gas recirculation amount when there is a possibility of misfires occurring and increase the internal exhaust gas recirculation amount when there is a possibility of knocking occurring.

8. The homogeneous charge compression ignition engine according to claim 7, wherein the control unit controls the variable valve actuation mechanism so as to retard the timing at which the exhaust valve closes in order to decrease the internal exhaust gas recirculation amount and controls the variable valve actuation mechanism so as to advance the timing at which the exhaust valve closes in order to increase the internal exhaust gas recirculation amount.

9. The homogeneous charge compression ignition engine according to claim 7, wherein the variable valve actuation mechanism closes the exhaust valve so that some burned gas remains in the combustion chamber during an exhaust stoke.

10. The homogeneous charge compression ignition engine according to claim 7, wherein the internal exhaust gas recirculation amount includes an upper limit and a lower limit that are set taking into consideration a safety margin.

11. The homogeneous charge compression ignition engine according to claim 7, wherein:

the storage device stores a second map or second relationship formula showing the relationship of the engine speed and load in which stable homogeneous charge compression ignition operation is enabled; and the determination unit determines whether homogeneous charge compression ignition operation is enabled using the second map or second relationship formula.

12. The homogeneous charge compression ignition engine according to claim 7, further comprising:

an igniter arranged in the combustion chamber, wherein the control unit compares coolant temperature of the homogeneous charge compression ignition engine with a regulated value to determine whether homogeneous charge compression ignition is enabled and performs spark ignition operation with the igniter when homogeneous charge compression ignition operation is disabled.

13. The homogeneous charge compression ignition engine according to claim 7, wherein the storage device stores a second map or second relationship formula showing the relationship of the engine speed and load in which stable homogeneous charge compression ignition operation is enabled, the homogeneous charge compression ignition engine further comprising:

an igniter arranged in the combustion chamber, wherein the control unit performs spark ignition operation with the igniter until the engine becomes warm and determines whether homogeneous charge compression ignition operation is enabled after the engine becomes warm using the second map or second relationship formula.

* * * * *

UNITED STATES PATENT AND TRADEMARK OFFICE
CERTIFICATE OF CORRECTION

PATENT NO.        : 6,978,771 B2                                              Page 1 of 1
APPLICATION NO. : 11/113409
DATED             : December 27, 2005
INVENTOR(S)       : Hiroshi Kuzuyama and Sigeru Aoki It is certified that error appears in the above-identified patent and that said Letters Patent is hereby corrected as shown below:

Column 5, line 54, delete "sensor 33 and The" and insert therefore -- sensor 33 and the --

Column 6, line 54, delete "internal. EGR" and insert therefore -- internal EGR --

Column 9, line 46, delete "internal. EGR" and insert therefore --internal EGR --

Signed and Sealed this

Fifth Day of September, 2006

JON W. DUDAS
*Director of the United States Patent and Trademark Office*